US008001831B2

(12) United States Patent
Watanabe et al.

(10) Patent No.: US 8,001,831 B2
(45) Date of Patent: Aug. 23, 2011

(54) POSITIONING APPARATUS AND SCANNING PROBE MICROSCOPE EMPLOYING THE SAME

(75) Inventors: Masafumi Watanabe, Chiba (JP);
Masatoshi Yasutake, Chiba (JP)

(73) Assignee: SII Nano Technology Inc. (JP)

( * ) Notice: Subject to any disclaimer, the term of this patent is extended or adjusted under 35 U.S.C. 154(b) by 567 days.

(21) Appl. No.: 12/129,350

(22) Filed: May 29, 2008

(65) Prior Publication Data
US 2008/0295570 A1  Dec. 4, 2008

(30) Foreign Application Priority Data

May 31, 2007  (JP) ................................. 2007-144364
May 8, 2008  (JP) ................................. 2008-122675

(51) Int. Cl.
*G01Q 10/00*  (2010.01)
*G01Q 90/00*  (2010.01)

(52) U.S. Cl. ................... 73/105; 73/1.89; 850/1; 850/2; 850/3

(58) Field of Classification Search .................... 73/1.89, 73/105; 850/1–3
See application file for complete search history.

(56) References Cited

U.S. PATENT DOCUMENTS

| 5,286,977 A * | 2/1994 | Yokoyama et al. ...... 250/442.11 |
| 5,297,130 A * | 3/1994 | Tagawa et al. ................ 369/126 |
| 6,085,581 A * | 7/2000 | Jones et al. ...................... 73/105 |
| 6,229,607 B1 * | 5/2001 | Shirai et al. .................... 356/614 |
| 7,024,925 B2 * | 4/2006 | Gweon et al. ................... 73/105 |
| 7,278,298 B2 * | 10/2007 | Hansma et al. ................. 73/105 |
| 2007/0085022 A1 * | 4/2007 | Ue ............................ 250/442.11 |

FOREIGN PATENT DOCUMENTS

| JP | 10-339735 A | 12/1998 |
| JP | 2001-330425 A | 11/2001 |

OTHER PUBLICATIONS

JPO web site: Hyojun-Gijutsusyu > Heisei 14 nendo: Hyomenkozo no Genshi ryoiki bunseki, "1-A-1-a Sousa-gata Tunnel Kenbikyo (Scanning Tunneling Microscope)", pp. 1-3 [http://www.jpo.go.jp/shiryou/s_sonota/hyoujun_gijutsu/spm/1_a_1_a.htm], Mar. 28, 2003.

* cited by examiner

*Primary Examiner* — Daniel Larkin
(74) *Attorney, Agent, or Firm* — Brinks Hofer Gilson & Lione

(57) ABSTRACT

There is provided a scanning probe microscope employing a positioning apparatus M1 including a unit to be driven in XY direction having a substantially square form in plane geometry at the center of the plane in the XY directions and having a first elastic support that bends in the X-axis direction at least on one side of the square form and a second elastic support that bends in the Y-axis direction at least on one side orthogonal to the side and a support unit that supports a stage unit 1 in the XY directions such that the facing surface can face in parallel against the facing surface of the unit to be driven in the XY directions. The positioning apparatus has a space of a predetermined thickness between the surface corresponding to the unit to be driven in the XY directions at least and the facing surface of the support unit that faces against it, and the space is filled with a viscosity agent.

9 Claims, 7 Drawing Sheets

15 = Cantilever Vibrating Unit
17= Laser Light Irradiating Unit
18 = Photodetector

POSITIONING APPARATUS AND SCANNING PROBE MICROSCOPE EMPLOYING THE SAME

RELATED APPLICATIONS

This application claims priority under 35 U.S.C. §119 to Japanese Patent Application No. JP2007-144364 filed May 31, 2007 and Japanese Patent Application No. JP2008-122675 filed May 8, 2008, the entire content of which is hereby incorporated by reference.

BACKGROUND

1. Field of the Invention

The present invention relates to a positioning apparatus that positions a subject by moving the subject by using a drive element in a first direction, a second direction that is orthogonal to the first direction and a third direction that is orthogonal to the first direction and the second direction and a scanning probe microscope including the same.

2. Description of the Related Art

The scanning probe microscope is a system including a cantilever having a sharpened probe at the free end and a movement mechanism that finely moves the relative positions of the cantilever and a subject (which will be called sample hereinafter) and detects the displacement of the free end of the cantilever due to the interaction between the distal end of the probe and the sample and, at the same time, scans the sample surface with the probe in a plane direction containing a first direction (which will be called X-axis direction hereinafter) and a second direction (which will be called Y-axis direction hereinafter), which is orthogonal thereto, that is, in the plane direction that is horizontal to the sample surface (which will be called XY directions hereinafter) to three-dimensionally measure the information on the surface form or a property of the sample. In measuring the surface form of the sample by means of the scanning probe microscope, the surface form of the sample is measured based on the stroke in the direction that is orthogonal to the XY directions, that is, in the direction that is vertical to the sample surface (which will be called Z-axis direction) by scanning in the XY directions and measuring the space between the sample and the probe from the amount of deformation of the cantilever and moving the probe in the Z-axis direction such that the spacing between the sample and the probe can be kept constant (refer to Web Site of Japanese Patent Office, HOME>Shiryoshitsu (Sonota Sanko Joho)>Hyojungijyutsu-Shu>Hyomenkouzou no Genshi Ryoiki Bunseki (Gijyutsu Naiyo, FIGS. 1 and 2), for example).

The movement mechanism of the scanning probe microscope may often be a positioning apparatus including a piezoelectric element. Since the surface form is tracked and is measured by moving the relative positions of the sample and the probe, the positioning apparatus for use in the scanning probe microscope is only required to scan the sample surface at a predetermined velocity in the XY directions. However, since the fine concaves and convexes on the sample surface must be tracked in the Z-axis direction, a faster responsivity at some slopes on the sample surface may be required than the one for the XY directions.

However, the responsivity of the positioning apparatus that drives in the multiple axial directions depends on the resonance frequency of the entire positioning apparatus including not only the mechanism for movement in the axial direction in which fast driving is desired but also the mechanism in the axial direction for slower driving, which are included in the positioning apparatus. Therefore, in a case of the positioning apparatus with a combination of multiple axes, the fast driving in a specific direction is not allowed.

Thus, in a conventional scanning probe microscope, to improve responsivity of the Z-axis direction, method to separate to a sample side and a cantilever side in binary movement mechanism of XY direction and the Z-axis direction is disclosed by JP-A-10-339735. Also, for similar purpose, a counterbalance method to attach a drive element to cancel the reaction to the movement mechanism for fast driving is disclosed by JP-A-2001-330425. However, the former example may have a problem that the displacement of a sample may occur when the sample is driven in the XY directions or that a large mass sample may not be driven fast in the XY directions since the resonance frequency is reduced inversely with the ½ power of the mass. The latter example may have a problem that two power supplies or a power supply having a double capacity may be required since the double amount of current is required for driving drive elements one of which is added for counter-balance.

It is an object of the invention to provide a positioning apparatus, which drives in multiple axial directions and is suitable for a scanning probe microscope, for preventing the decrease in resonance frequency in the axial direction subject to fast driving due to the crosstalk caused by a combination of a movement mechanism to be driven fast and a movement mechanism to be driven slow and improving the responsivity in the axial direction subject to fast driving by improving the controllable frequency band as a whole such that fast measurement can be allowed, and a scanning probe microscope employing the positioning apparatus.

SUMMARY OF THE INVENTION

The first invention of the present application is a positioning apparatus including a substantially plate-shaped stage unit arranged in first and second directions (which will be called XY directions hereinafter), the stage unit having a substantially square form in plane geometry substantially at the center of the plane including the first direction (which will be called X-axis direction hereinafter) and the second direction (which will be described Y-axis direction) orthogonal to the X-axis direction and having a unit to be driven in the XY directions having a first elastic support that bends in the X-axis direction at least on one side of the square form and a second elastic support that bends in the Y-axis direction at least on one side orthogonal to the side, a first drive element (which will be called drive element in the X-axis direction) that expands and contracts in the X-axis direction and has one end that presses the first elastic support, a second drive element (which will be called drive element in the Y-axis direction) that expands and contracts in the Y-axis direction and has one end that presses the second elastic support, a third drive element (which will be called drive element in the Z-axis direction) that expands and contracts in the third direction (which will be called Z-axis direction) orthogonal to the X-axis and Y-axis directions and has one end on a first surface side of the unit to be driven in the XY directions, and a support unit that supports the stage unit in the XY directions so that a surface facing against a second surface facing against the first surface where the drive element in the Z-axis direction is placed on the stage unit in the XY directions can face in parallel against the second surface, wherein a subject (which will be called sample) is mounted on the end of the drive element in the Z-axis direction on the opposite side of the unit to be driven in the XY direction, and the sample is positioned by moving the sample in the X-axis, Y-axis and Z-axis directions by causing the drive elements in X-axis, Y-axis and Z-axis directions to expand and contract in the respective directions, and the positioning apparatus has a space of a predetermined thickness between the surface corresponding to the unit to be driven in the XY directions at least of the second surface of the stage unit in the XY directions and the facing surface of the support unit that faces against it, and the space is filled with a viscosity agent.

A fixing unit is placed on the unit to be driven in the XY directions through first and second elastic supports. The unit to be driven in the XY directions, the fixing unit and the first elastic support and the second elastic support have an integral structure, which is produced from a single metallic block, and the top surface and bottom surface in the Z-axis direction of each of them are preferably one seamless plane. The integral molding can be achieved by electrical discharge machining.

The drive element in the Z-axis direction is bonded and fixed onto the first surface of the unit to be driven in the XY directions. The drive element in the Z-axis direction is fixed within the vertical line from the outer edge of the surface of the unit to be driven in the XY directions, which faces against the support unit, to the Z-axis direction. The barycenter of the drive element in the Z-axis direction is desirably positioned immediately above in the Z-axis direction of the barycenter of the unit to be driven in the XY directions.

The second invention of the present application is the positioning apparatus, wherein the thickness of the space is 5 to 50 µm. More preferably, it is 10 to 30 µm.

If the space is thicker than 50 µm, a viscosity agent therein flows since the space between the stage unit in the XY directions and the support unit is too large. Then, in driving in the Z-axis direction, the unit to be driven in XY directions vibrates in the Z-axis direction, and the amplitude in the Z-axis direction of the unit to be driven in the XY directions increases, which is not preferable. If the thickness of the space is smaller than 5 µm, it is difficult to inject a viscosity agent, which is not preferable.

The third invention of the present application is the positioning apparatus, wherein a spacer is provided between the second surface corresponding to the part excluding the unit to be driven in the XY directions and excluding the first and second elastic supports in the stage unit in the XY directions and the facing surface of the support unit, and the thickness of the spacer is equal to or smaller than 50 µm and is larger than $r+(Rzb+Rzh)\div 2$ where the diameter of fine particles contained in the viscosity agent is r; the maximum height indicating the surface roughness of the second surface of the unit to be driven in the XY directions is Rzh and the maximum height indicating the surface roughness of the facing surface of the support unit is Rzb.

In this case, Rzh is the maximum height of the concaves and convexes of the second surface of the unit to be driven in the XY directions, and Rzb is the maximum height of the concaves and convexes of the support unit, which faces thereagainst. Both of them indicate the surface roughness. They are expressed by the sum of the height Yp from the average line of the extracted part resulting from the extraction of a part from a roughness curve by a reference length l in the direction of the average line to the highest peak and the depth Yv to the lowest valley therefrom. According to the invention, the reference length l is defined as the maximum amount of displacement in the X-axis direction and the Y-axis direction of the positioning apparatus of the invention.

The thickness of the spacer is equal to or smaller than 50 µm such that the thickness of the space can be equal to or smaller than 50 µm. As a result of experiments, when the thickness of the spacer is thicker than 50 µm, the space between the unit to be driven in the XY directions and the support unit is wider. Thus, the viscosity agent filled in the space easily flows in the XY directions. Therefore, the thickness of the spacer is defined to be equal to or smaller than 50 µm. In order to prevent the occurrence of the part where the space between the unit to be driven in the XY directions and the support unit is narrower than the diameter of the fine particles contained in the viscosity agent, the lowest limit of the thickness of the spacer is defined by the relational expression as described above.

The fourth invention of the present application is the positioning apparatus, wherein the unit to be driven in the XY directions has a concave on the first surface side having the drive element in the Z-axis direction, the drive element in the Z-axis direction is placed within the concave, and the entire barycenter of the unit to be driven in the XY directions, the drive element in the Z-axis direction and the sample is adjusted to bring between the upper surface and lower surface, which face in the Z-axis direction, of the drive element in the X-axis direction and drive element in the Y-axis direction.

The fifth invention of the present application is characterized in that the viscosity agent is grease. The sixth invention is characterized in that the viscosity agent is lubricating oil. The seventh invention is characterized in that the viscosity agent is a gel-like substance. The grease or viscosity agent preferably contains fine particles of 5 µm or smaller in diameter and has a viscosity that does not flow from the space and a consistency that is equal to or smaller than 300 (1/10 mm). The gel-like substance may be silicone gel. However, it should be noted that the resistance in driving increases since gel has a high viscosity.

The eighth invention of the present application is the positioning apparatus, wherein the thickness of the space is preferably 5 to 50 µm, and in order to prevent the fine particles contained in the grease or viscosity agent between the second surface of the positioning apparatus and the facing surface of the support unit, Rzh is equal to or smaller than 10 µm, and Rzb is equal to or smaller than 10 µm where the maximum height indicating the surface roughness of the second surface of the unit to be driven in the XY directions is Rzh and the maximum height indicating the surface roughness of the facing surface of the support unit is Rzb.

The ninth invention of the present application is a scanning probe microscope including a probe to be brought closely to or in contact with a sample and a positioning apparatus that positions the sample by moving the sample in an X-axis direction, a Y-axis direction orthogonal to the X-axis direction and a Z-axis direction orthogonal to the X-axis direction and the Y-axis direction, wherein the positioning apparatus is one of the aforesaid positioning apparatus.

In the positioning apparatus according to the invention, a second surface, which is a smooth facing surface against a support unit for a unit to be driven in the XY directions and a smooth facing surface of the support unit are faced against each other through a space of a predetermined thickness. A viscosity agent is injected into the space to fix the unit to be driven in the XY directions onto the support unit. A drive element in the Z-axis direction for fast driving is placed on a first surface of the unit to be driven in the XY directions, which faces against the facing surface of the support unit.

Because of the configuration in the positioning apparatus of the invention, the unit to be driven in the XY directions is fixed tightly against the support unit by the viscosity of the viscosity agent. As a result, the amplitude of the vibrations in the Z-axis direction of the unit to be driven in the XY directions is reduced due to the force applied to the unit to be driven in the XY directions when the drive element in the Z-axis direction is driven, compared with the state that the unit to be driven in the XY directions of the positioning apparatus is not in intimate contact with the support unit but floats.

In the positioning apparatus of the invention, because of the configuration, the unit to be driven in the XY directions is fixed against the support unit tightly by the viscosity of the viscosity agent. Therefore, the rigidity in the Z-axis direction of the unit to be driven in the XY directions is increased, and the resonance frequency in the vibration mode in the Z-axis direction improves. In other words, the resonance frequency of the vibrations in the Z-axis direction increases, and the speed of the driving in the Z-axis direction increases. Since the lengths in the XY directions of the external form of the positioning apparatus having the form as described above are longer than the length in the Z-axis direction, the resonance in the primary mode may often be the vibration mode in the Z-axis direction. However, since the resonance frequency of the vibrations in the Z-axis direction improves, the resonance frequency in the primary mode that limits the control band of the entire positioning apparatus improves.

In the positioning apparatus of the invention, the unit to be driven in the XY directions is in intimate contact with the support unit through the viscosity agent thinly filled in the space. Thus, the viscosity of the viscosity agent prevents the unit to be driven in the XY directions from floating in the Z-axis direction. In addition, the direction of vibrations of the unit to be driven in the XY directions is constrained to the X-Y plane. Therefore, the movement in the Z-axis direction is no longer included in the vibration mode at lower resonance frequencies, and the control band in the Z-axis direction is not limited by lower resonance frequencies in the XY directions.

For those reasons, in the positioning apparatus of the invention, the amplitude of the vibrations in the Z-axis direction of the unit to be driven in the XY directions having the drive element in the Z-axis direction is reduced, and the resonance frequency of the vibrations in the Z-axis direction is increased. Furthermore, the speed of the driving in the Z-axis direction is increased, and the resonance frequency of the vibrations in the Z-axis direction that limits the control band of the entire positioning apparatus is improved. Furthermore, the movement in the Z-axis direction is not included in the vibration mode at a lower resonance frequency, and the control band in the Z-axis direction is not limited by lower resonance frequencies in the XY directions. As a result, the controllable frequency band in the entire positioning apparatus can be improved, and the responsivity in the Z-axis direction to be driven at a higher speed can be improved.

In a scanning probe microscope employing the positioning apparatus of the invention as described above, a sample is moved in multiple axial directions, and the surface of the sample having minute concaves and convexes is tracked in measuring the surface form of the sample. Therefore, the speed of the responsivity in the Z-axis direction that requires the highest responsivity can be increased, and the control band in the Z-axis direction can be extended, which can increase the speed of measurement.

In the positioning apparatus according to the invention, the first surface having the drive element in the Z-axis direction of the unit to be driven in the XY directions has a concave, and the drive element in the Z-axis direction is placed within the concave. The entire barycenter of the unit to be driven in the XY directions, the drive element in the Z-axis direction and the sample placed above in the Z-axis direction is adjusted to bring between the upper surface and lower surface, which face against each other in the Z-axis direction, of the drive element in the X-axis direction and drive element in the Y-axis direction.

In the positioning apparatus of the invention, because of the structure, the movement to be twisted in the Z-axis direction of the unit to be driven in the XY directions can be prevented when it is driven in the XY directions, and the crosstalk in the Z-axis direction, which is caused by the operation in the XY directions, can be prevented. Therefore, the mix of the movement in the Z-axis direction to the movement in the vibration mode at a lower resonance frequency can be further suppressed, and the control band in the Z-axis direction is not limited by a lower resonance frequency in the XY directions.

In the positioning apparatus of the invention, because of the structure, the occurrence of the vibrations in the direction that falls in the XY directions the drive element 7 in the Z-axis direction can be prevented when it is driven in the XY directions. Therefore, the mix of the crosstalk in the XY directions to the vibrations in the Z-axis direction can be prevented, and the precision of the responsivity in the Z-axis direction can be further improved.

In the scanning probe microscope of the invention employing the positioning apparatus of the invention as described above, a sample is moved in multiple axial directions, and the surface of the sample having minute concaves and convexes is tracked in measuring the surface form of the sample. Therefore, the speed of the responsivity in the Z-axis direction that requires the highest responsivity can be further increased, and the control band in the Z-axis direction can be extended, which can increase the speed of measurement.

In the positioning apparatus of the invention, when the unit to be driven in the XY directions vibrates in the Z-axis direction, the viscosity agent is pushed out from the space between the support unit and the unit to be driven in the XY directions. However, the viscosity agent is coated by a thickness of 50 µm or thinner, and the friction based on the viscosity resistance of the viscosity agent is large. Therefore, a significantly small amount of the viscosity agent is pushed out, and the viscosity agent is not easily lost. As a result, the amplitude of the vibrations in the Z-axis direction of the unit to be driven in the XY directions can be suppressed over the long run.

BRIEF DESCRIPTION OF THE DRAWINGS

FIG. 2 only shows X- and Y-axis directions, and the Z-axis direction is the direction orthogonal to the paper.

FIG. 3 only shows X- and Z-axis directions, and Y-axis direction is the direction orthogonal to the paper.

DESCRIPTION OF THE PREFERRED EMBODIMENTS

With reference to FIGS. 1 to 5, a first embodiment of a positioning apparatus and a scanning probe microscope employing it according to the invention will be described below.

Figure 1:
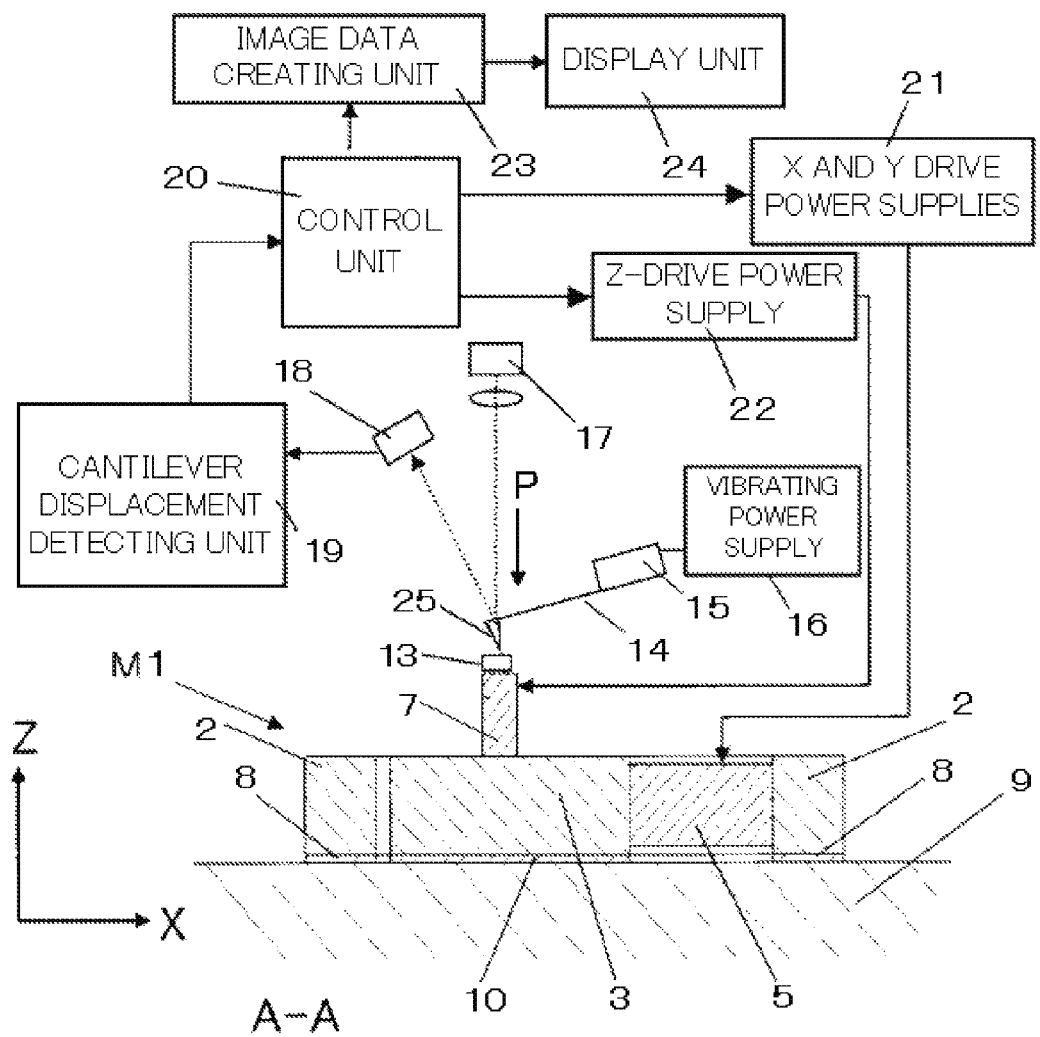
FIG. 1 It is a schematic diagram of a scanning probe microscope employing a positioning apparatus according to the invention.
Figure 2:
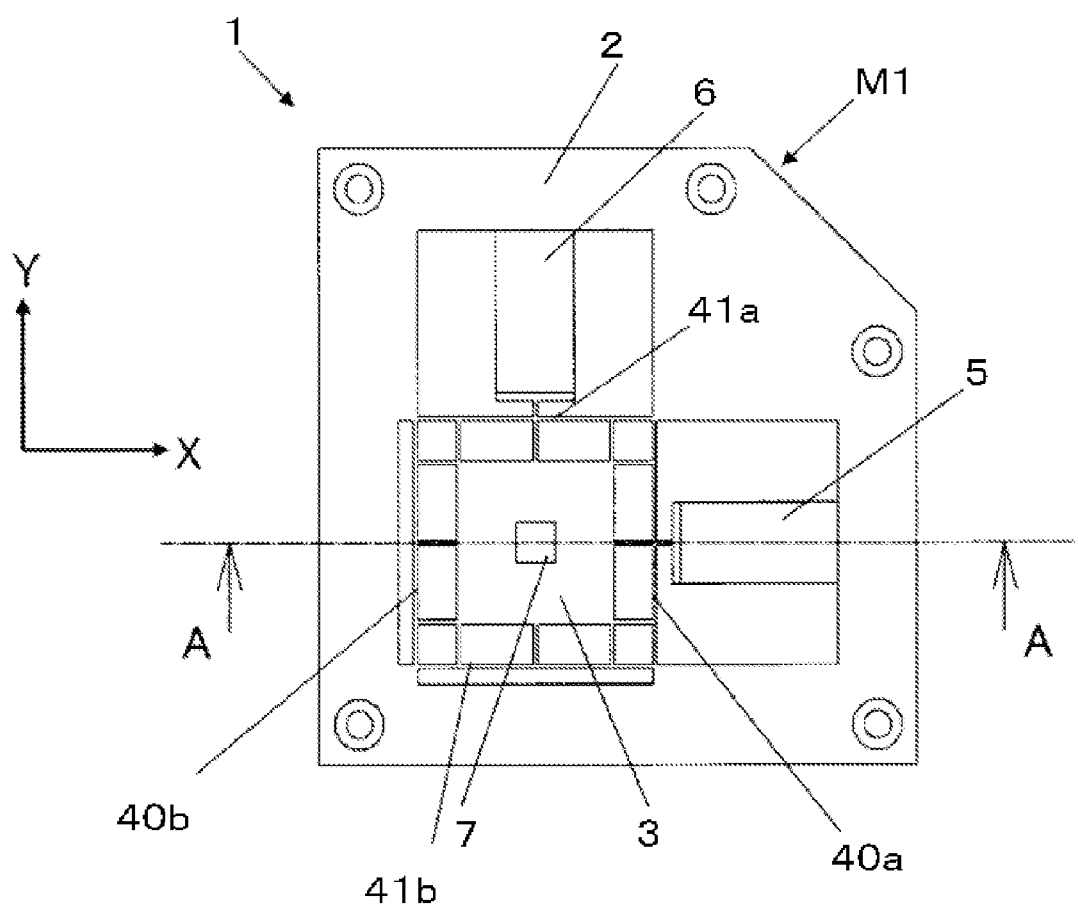
FIG. 2 It is a plan view showing a positioning apparatus M1 in a first embodiment according to the invention.

A scanning probe microscope according to this embodiment mainly includes, as shown in FIG. 1, a probe P to be brought closely to or in contact with a sample 13, which is a subject, and a positioning apparatus M1 that positions the sample 13 by moving the sample 13 in X-, Y- and Z-axis directions (FIG. 1 only shows X- and Z-axis directions, and the Y-axis direction is the direction orthogonal to the paper).

The probe P includes, as shown in the figure, a cantilever 14 having a sharpened probe 25 at the free end, a cantilever vibrating unit 15 that vibrates the cantilever 14 and a vibrating power supply 16 for driving the cantilever vibrating unit 15.

The positioning apparatus M1 on the other hand includes, as shown in FIGS. 1 to 5, a stage unit 1 arranged in the XY directions having a substantially plate form, a drive element 5 in the X-axis direction, a drive element 6 in the Y-axis direction, a drive element 7 in the Z-axis direction and a support unit 9. The stage unit 1 has a unit 3 to be driven in the XY directions and a fixing unit 2. The unit 3 has a substantially square form in plane geometry substantially at the center of the surface including the X-axis direction and the Y-axis direction and has first elastic supports 40a and 40b that bend in the X-axis direction on two facing sides and second elastic supports 41a and 41b that bend in the Y-axis direction on facing two sides. The fixing unit 2 is provided around the unit 3 to be driven in the XY directions through the first and second elastic supports 40a and 40b and 41a and 41b. The drive element 5 expands and contracts in the X-axis direction and has one end that presses the first elastic supports 40a and 40b. The drive element 6 expands and contracts in the Y-axis direction and has one end that presses the second elastic supports 41a and 41b. The drive element 7 expands and contracts in the Z-axis direction and has one end on the side of a first surface 3a of the unit 3 to be driven in the XY directions. The stage unit 1 includes a first surface 1a and a second surface 1b. The support unit 9 supports the stage unit 1 in the XY directions so that a surface 9a faces against the second surface 1b of the stage unit 1. The second surface 1b faces against the first surface 1a of the stage unit 1. The drive element 7 in the Z axis direction is placed on the first surface 1a of the stage unit 1. The first surface 1a of the stage unit 1 is in parallel with the second surface 1b in the XY directions.

In this case, the first elastic supports 40a and 40b and the second elastic supports 41a and 41b have a function of allowing the independent displacement of the axes when force in the X-axis direction or Y-axis direction is applied to the unit 3 to be driven in the XY directions by driving the drive element 5 in the X-axis direction and the drive element 6 in the Y-axis direction, constraining the direction of driving to the XY directions and preventing the crosstalk in the XY directions.

The unit 3 to be driven in the XY directions, the fixing unit 2 and the first elastic supports 40a and 40b and the second elastic supports 41a and 41b have an integral structure, which is produced by electrical discharge machining from a single metallic block, and the top surface and bottom surface in the Z-axis direction of each of them are preferably one seamless plane. This is for preventing the existence of a friction surface between the fixing unit 2 and the unit 3 to be driven in the XY directions since the existence of mechanical friction between the fixing unit 2 and the unit 3 to be driven in the XY directions disables the repetitive driving at a nanometer level.

The fixing unit 2 of the stage unit 1 in the XY directions has through holes adjacent to the first elastic support 40a and the second elastic support 41a. The drive element 5 in the X-axis direction and the drive element 6 in the Y-axis direction are placed within the through holes. The drive elements 5, 6 and 7 in the X, Y and Z directions are desirably laminated piezoelectric element such as a piezo element in which multiple piezoelectric elements that expand in response to the application of voltage are stacked.

The drive element 7 in the Z-axis direction is bonded and fixed onto the first surface 3a of the unit 3 to be driven in the XY directions. The drive element 7 in the Z-axis direction is fixed within the vertical line from the outer edge of the surface of the unit 3 to be driven in the XY directions, which faces against the support unit 9, to the Z-axis direction. The barycenter of the drive element 7 in the Z-axis direction is desirably positioned immediately above in the Z-axis direction of the barycenter of the unit 3 to be driven in the XY directions. This construction can prevent the mix of vibrations in the XY directions of the drive element 7 in the Z-axis direction when the unit 3 to be driven in the XY directions is driven in the XY directions and allows control with high precision.

The sample 13 is mounted on the drive element 7 in the Z-axis direction, and the probe 25 at the free end of the cantilever 14 is placed immediately thereabove so as to be close to or in contact with the sample 13. Laser light is irradiated from a laser light irradiating unit 17 to the cantilever 14, and the laser light reflected by the cantilever 14 enters to a photodetector 18. From the incident position, the amount of displacement of the cantilever 14 is detected by a cantilever displacement detecting unit 19. The method for detecting an amount of displacement as described above is called optical lever system. Based on the amount of displacement of the cantilever 14, which is detected by the cantilever displacement detecting unit 19, a control unit 20 outputs a control signal for the drive element 7 in the Z-axis direction to a Z-drive power supply 22, and the drive element 7 in the Z-axis direction is driven. Also for the XY directions, the control unit 20 outputs control signals to X and Y drive power supplies 21, and the drive element 5 in the X-axis direction and the drive element 6 in the Y-axis direction are driven.

In this way, the positioning apparatus M1 according to this embodiment drives the drive element 5 in the X direction, presses the first elastic supports 40a and 40b, bends the first elastic supports 40a and 40b in the X-axis direction, drives the drive element 6 in the Y-axis direction, presses the second elastic supports 41a and 41b, bends the second elastic supports 41a and 41b in the Y-axis direction, thus displaces the axes independently, changes the position of the unit 3 to be driven in the XY directions and moves in the XY directions the sample 13 mounted on the drive element 7 in the Z-axis direction, which is placed on the unit 3 to be driven in the XY directions. Since the sample 13 is placed on the drive element 7 in the Z-axis direction, the sample 13 is moved in the Z-axis direction by the expansion and contract of the drive element 7 in the Z-axis direction. Therefore, with the construction described above, the positioning of the sample 13 is performed by moving the sample 13 in the X-, Y- and Z-axis directions.

Figure 3:
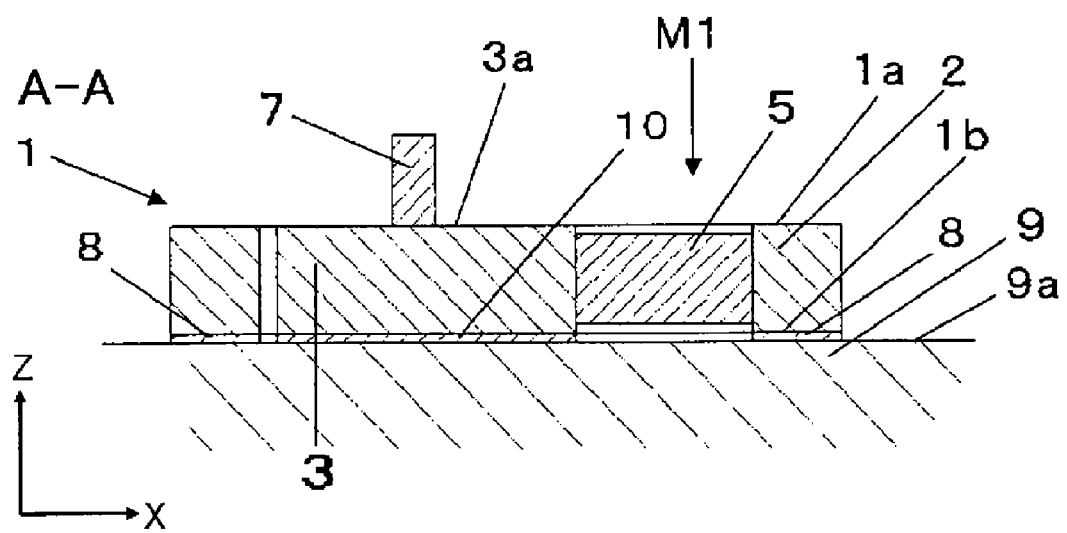
FIG. 3 It is a section view taken on the line A-A in FIG. 2, that is, the section view taken on the line A-A of the positioning apparatus M1.
Figure 4:
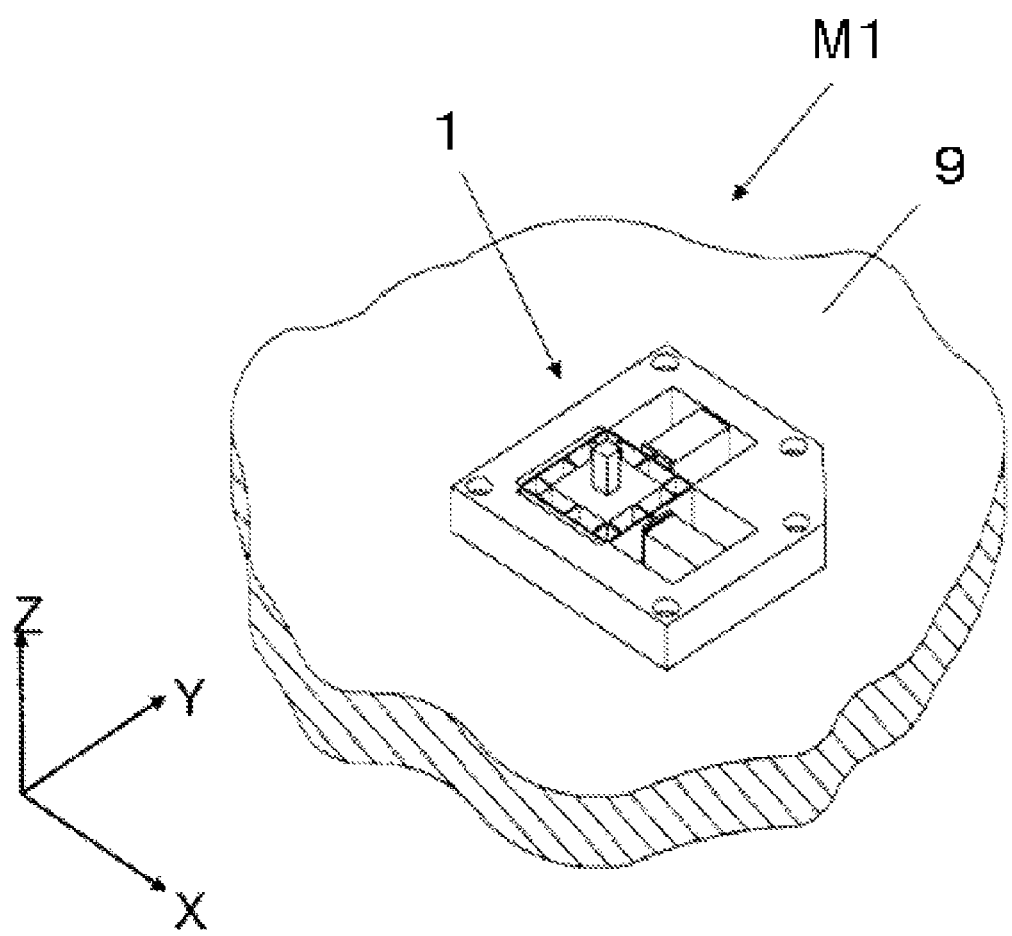
FIG. 4 It is a perspective view showing the positioning apparatus M1 in the first embodiment according to the invention.

In this case, each of the drive element 5 in the X-axis direction and the drive element 6 in the Y-axis direction have ends in contact with the first elastic support 40a and the second elastic support 41a, respectively, as shown in FIGS. 1 to 3, and have the other fixed ends in contact with the fixing unit 2. The drive element 5 in the X-axis direction and the drive element 6 in the Y-axis direction are particularly fixed so as to be higher than the second surface 1b of the stage unit 1 in the XY directions as shown in FIG. 3 and are prevented from the contact with the support unit 9 for preventing the interfere with the driving.

The positioning apparatus M1 of this embodiment has a space of a predetermined thickness between the surface corresponding to the unit 3 to be driven in the XY directions at least of the second surface 1b of the stage unit 1 in the XY directions and the facing surface 9a of the support unit 9 that faces against it, and the space is filled with a viscosity agent 10.

The thickness of the space is preferably 5 to 50 μm and is more preferably 10 to 30 μm.

This is because, as a result of experiments, it is significantly difficult to inject a viscosity agent to the space smaller than 5 μm and it is hard to obtain the advantages of the invention and because the space between the stage unit 1 in the XY directions and the support unit 9 is too large if the space is larger than 50 μm, which results in the flow of the viscosity agent 10. In the latter case, the driving in the Z-axis direction vibrates in the Z-axis direction the unit 3 to be driven in the XY directions, and the amplitude in the Z-axis direction of the unit 3 to be driven in the XY directions is increased.

Figure 5:
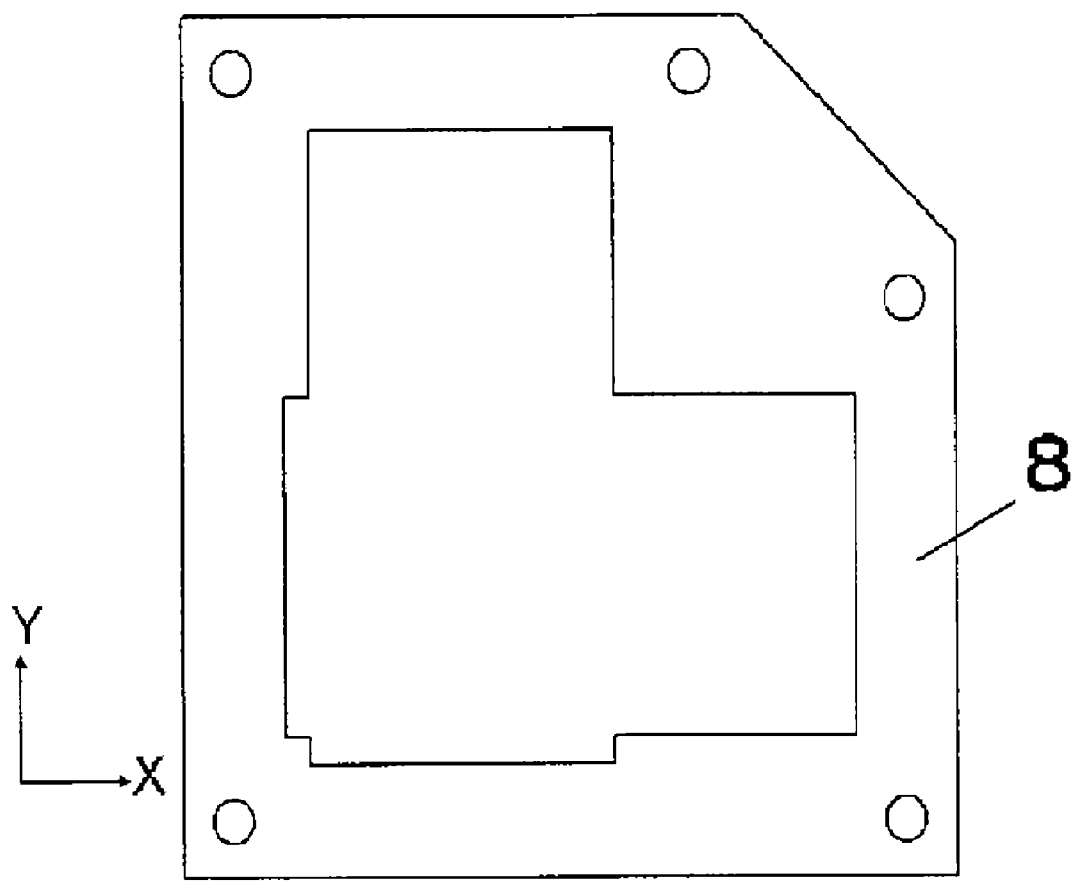
FIG. 5 It is a plan view showing a form of the spacer to be used in the positioning apparatus M1 in the first embodiment according to the invention.

In the positioning apparatus M1 of this embodiment, as shown in FIGS. 3 and 5, a spacer 8 is provided in the part excluding the unit 3 to be driven in the XY directions of the stage unit 1 in the XY directions and excluding the part having the through-holes, that is, between the second surface 1b corresponding to the fixing unit 2 and the facing surface 9a of the support unit 9, and the thickness of the spacer 8 is equal to or smaller than 50 μm and is larger than r+(Rzb+Rzh)÷2 where the diameter of fine particles contained in the viscosity agent 10 is r.

The maximum height Rzh and the maximum height Rzb indicate the surface roughness and are expressed by the sum of the height Yp from the average line of the extracted part resulting from the extraction of a part from a roughness curve by a reference length 1 in the direction of the average line to the highest peak and the depth Yv to the lowest valley therefrom. According to the invention, the reference length 1 is defined as the maximum amount of displacement in the X-axis direction and the Y-axis direction of the positioning apparatus of the invention.

Since the diameter of the fine particles contained in grease, for example, which is often used as the viscosity agent 10, is about 5 μm, the maximum height Rzh indicating the surface roughness of the second surface 1b of the stage unit 1 in the XY directions and the Rzb indicating the surface roughness of the facing surface 9a of the support unit 9 for fixing the stage unit 1 in the XY directions are equal to or smaller than 10 μm as a guide such that they can be lower than the diameter of the fine particles at the peaks of the concaves and convexes of the surface and can be shallower than the diameter of the fine particles at the valleys.

This is because, as a result of experiments, when the thickness of the spacer 8 is thicker than 50 μm, the space between the unit 3 to be driven in the XY directions and the support unit 9 is wider. Thus, the viscosity agent 10 filled in the space easily flows in the XY directions. Then, the unit 3 to be driven in the XY directions vibrates when the drive element 7 in the Z-axis direction is driven. In order to prevent the occurrence of the part where the space between the unit 3 to be driven in the XY directions and the support unit 9 is narrower than the diameter of the fine particles contained in the viscosity agent 10, the lowest limit of the thickness of the spacer 8 is defined by the relational expression as described above.

As a result of experiments, the thickness of the space is preferably 5 to 50 μm and is more preferably 10 to 30 μm. The diameter of fine particles contained in generic grease is about 5 μm. Therefore, based on the expression above, the maximum height Rzh and the maximum height Rzb are preferably equal to or smaller than 10 μm.

The stage unit 1 in the XY directions is screwed onto the support unit 9 through the spacer 8.

The materials of the stage unit 1 in the XY directions and the support unit 9 are required to have a high Young's modulus to an extent that the sample 13 of a maximum mass expected to be driven by the positioning apparatus M1 is not displaced by the amount equal to or larger than the resolution in the Z-axis direction of the positioning apparatus M1 by the stress caused when the sample 13 is driven in the Z-axis direction by a maximum acceleration used in the positioning apparatus M1. The mass of the support unit 9 is required to be heavy to an extent that the support unit 9 does not move in the Z-axis direction by the amount equal to or larger than the resolution in the Z-axis direction of the positioning apparatus when driven under the same condition.

The viscosity agent 10 to be used in the positioning apparatus M1 in this embodiment may be grease or lubricating oil. The diameter of the fine particles contained therein is preferably 5 μm or smaller. The viscosity agent 10 preferably has a viscosity that does not flow from the space and a consistency that is equal to or smaller than 300 (1/10 mm).

Apparently, in the scanning probe microscope of this embodiment, the measurement data obtained by the cantilever displacement detecting unit 19 is transmitted to the control unit 20 and then to an image data creating unit 23 where the measurement data is converted to an image, and the image is displayed on a display unit 24.

Instead of the structure that drives the sample 13 in the X-, Y- and Z-axis directions as in the embodiment, the structure of the scanning probe microscope may be a structure that drives the cantilever 14 in the X-, Y- and Z-axis directions by the positioning apparatus of this embodiment. The method for detecting the amount of displacement of the cantilever 14 is not limited to the optical lever system but may be a method that detects the displacement of the cantilever by using a cantilever with an evaporated distortion gauge. Furthermore, a scanning tunnel microscope may be used which uses tunnel current instead of the cantilever.

In a case of the structure that drives the cantilever 14 in the X-, Y- and Z-axis directions by the positioning apparatus of this embodiment, the resonance frequency in inversely proportional with the ½ power of the mass of the sample 13 is not reduced unlike conventional cases, and the structure is not limited by the resonance frequency.

Since, in the positioning apparatus M1 of this embodiment, one end of the drive element 7 in the Z-axis direction only expands and contracts, a smaller amount of current is only required to drive the drive element, instead of the double amount of current as in the conventional cases. Therefore, a smaller power supply can be used, and the costs can be reduced.

Therefore, the positioning apparatus described in this embodiment and the scanning probe microscope employing it have following advantages.

1. In the positioning apparatus in which a drive element in the Z-axis direction is mounted on the unit 3 to be driven in the XY directions, there is a problem that the unit 3 to be driven in the XY directions vibrates in the Z-axis direction due to the force applied to the unit 3 to be driven in the XY directions when the drive element is driven in the Z-axis direction. However, in the positioning apparatus M1 of this embodiment, the unit 3 to be driven in the XY directions has the structure in which the unit 3 to be driven in the XY directions is supported in the Z-axis direction by the support unit 9 through not only the first and second elastic supports 40a, 40b, 41a and 41b but also the viscosity agent 10. Therefore, the unit 3 to be driven in the XY directions is fixed tightly against the support unit 9 by the viscosity of the viscosity agent 10. As a result, the amplitude of the vibrations in the Z-axis direction of the unit 3 to be driven in the XY directions is reduced due to the force applied to the unit 3 to be driven in the XY directions when the drive element 7 in the Z-axis direction is driven, compared with the state that the unit 3 to be driven in the XY directions of the positioning apparatus is not in intimate contact with the support unit 9 but floats.

2. The positioning apparatus M1 of this embodiment has the structure in which the unit 3 to be driven in the XY directions is supported in the Z-axis direction against the support unit 9 through not only the first and second elastic supports 40a, 40b, 41a and 41b but also the viscosity agent 10. Thus, the unit 3 to be driven in the XY directions is fixed against the support unit 9 tightly by the viscosity of the viscosity agent 10. Therefore, the rigidity in the Z-axis direction of the unit 3 to be driven in the XY directions is increased, and the resonance frequency in the vibration mode in the Z-axis direction improves. In other words, the resonance frequency in the Z-axis direction increases, and the speed of the driving in the Z-axis direction increases. Since the lengths in the XY directions of the external form of the positioning apparatus having the form as described above are longer than the length in the Z-axis direction, the resonance in the primary mode may often be the vibration mode in the Z-axis direction. However, since the resonance frequency of the vibrations in the Z-axis direction improves, the resonance frequency in the primary mode that limits the control band of the entire positioning apparatus M1 improves.

3. In a conventional positioning apparatus having the configuration in which the drive element in the Z-axis direction is mounted on the unit 3 to be driven in XY directions, the direction of a lower vibration mode may be the synthesis direction of the X, Y and Z directions or may be the direction of rotation about the Z-axis direction. In a case of the direction of rotation, since the direction is not completely parallel with the sample surface having concaves and convexes, the control band in the Z-axis direction to be driven at a high speed is limited due to the existence of the lower vibration mode. However, in the positioning apparatus M1 of this embodiment, the unit 3 to be driven in the XY directions is in intimate contact with the support unit 9 through the thinly filled viscosity agent 10. Thus, the viscosity of the viscosity agent 10 prevents the unit 3 to be driven in the XY directions from floating in the Z-axis direction. In addition, the direction of vibrations of the unit 3 to be driven in the XY directions is constrained to the X-Y plane. Therefore, the movement in the Z-axis direction is no longer included in the vibration mode at lower resonance frequencies, and the control band in the Z-axis direction is not limited by lower resonance frequencies in the XY directions.

For those reasons, in the positioning apparatus M1 of this embodiment, the amplitude of the vibrations in the Z-axis direction of the unit 3 to be driven in the XY directions having the drive element 7 in the Z-axis direction is reduced, and the resonance frequency of the vibrations in the Z-axis direction is increased. Furthermore, the speed of the driving in the Z-axis direction is increased, and the resonance frequency of the vibrations in the Z-axis direction that limits the control band of the entire positioning apparatus M1 is improved. Furthermore, the movement in the Z-axis direction is not included in the vibration mode at a lower resonance frequency, and the control band in the Z-axis direction is not limited by lower resonance frequencies in the XY directions. As a result, the controllable frequency band in the entire positioning apparatus M1 can be improved, and the responsivity in the Z-axis direction to be driven at a higher speed can be improved.

In the scanning probe microscope of this embodiment employing the positioning apparatus M1 of this embodiment as described above, the sample 13 is moved in multiple axial directions, and the surface of the sample 13 having minute concaves and convexes is tracked in measuring the surface form of the sample 13. Therefore, the speed of the responsivity in the Z-axis direction that requires the highest responsivity can be increased, and the control band in the Z-axis direction can be extended, which can increase the speed of measurement.

In the positioning apparatus M1 of this embodiment, when the unit 3 to be driven in the XY directions vibrates in the Z-axis direction, the viscosity agent 10 is pushed out from the space between the support unit 9 and the unit 3 to be driven in the XY directions. However, the viscosity agent 10 is coated by a thickness of 50 μm or thinner, and the friction based on the viscosity resistance of the viscosity agent 10 is large. Therefore, a significantly small amount of the viscosity agent 10 is pushed out, and the viscosity agent 10 is not easily lost. As a result, the amplitude of the vibrations in the Z-axis direction of the unit 3 to be driven in the XY directions can be suppressed over the long run.

Figure 6:
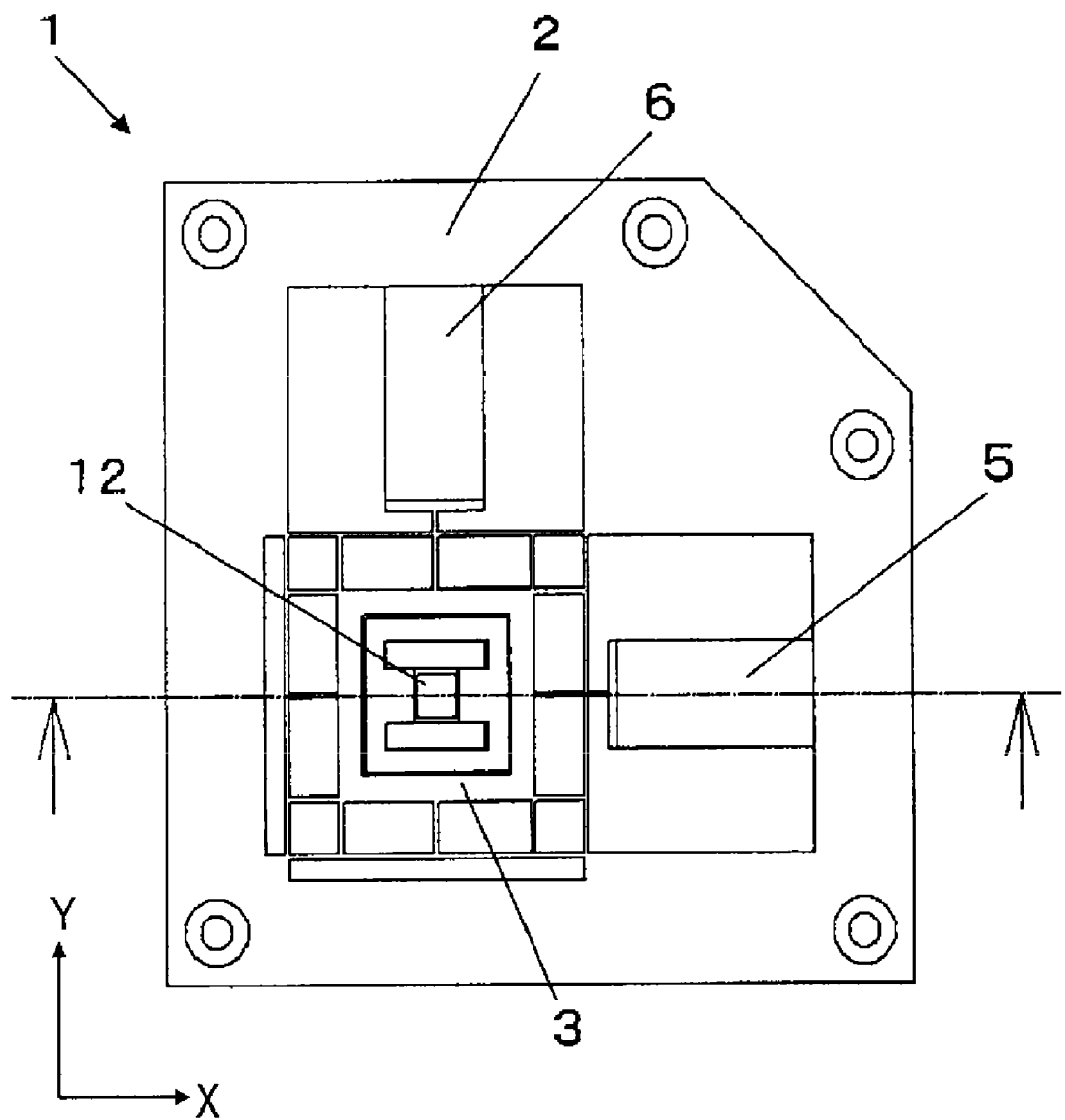
FIG. 6 It is a plan view showing a positioning apparatus in a second embodiment according to the invention.
Figure 7:
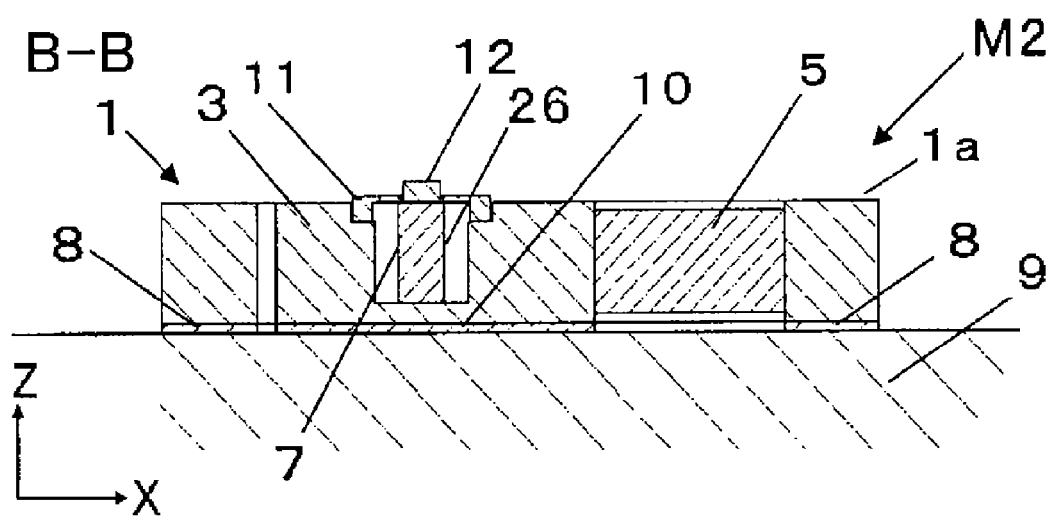
FIG. 7 It is a section view taken on the line B-B in FIG. 6.

With reference to FIGS. 1, 6 and 7, a second embodiment of the invention will be described below. A scanning probe microscope of this embodiment has a substantially identical configuration to that of the scanning probe microscope of Example 1.

The scanning probe microscope of this embodiment mainly includes, as shown in FIG. 1, a probe P to be brought closely to or in contact with a sample 13, which is a subject, and a positioning apparatus M2 shown in FIGS. 6 and 7 that positions the sample 13 by moving the sample 13 in X-, Y- and Z-axis directions, instead of the positioning apparatus M1.

The configuration of the probe P, the driving mechanism of the positioning apparatus M2 and the mechanism of displaying measurement results are the same as those of Example 1, and the descriptions thereon will be omitted.

As shown in FIGS. 6 and 7 (where FIG. 6 shows a plan view of the positioning apparatus M2, and FIG. 6 only shows X- and Y-axis directions, and the Z-axis direction is the direction orthogonal to the paper, and FIG. 7 shows the section view taken on the line B-B of the positioning apparatus M2, and FIG. 7 only shows X and Z axis directions, and the Y-axis direction is the direction orthogonal to the paper), the positioning apparatus M2 has substantially the same configuration as that of the positioning apparatus M1 of Example 1. Therefore, the same reference numerals as those of Example 1 are given to the same components, and the descriptions thereon will be omitted herein.

In the positioning apparatus M2 of this embodiment, the first surface 1a having the drive element 7 in the Z-axis direction of the unit 3 to be driven in the XY directions has a concave 26, and the drive element 7 in the Z-axis direction is placed within the concave 26. The entire barycenter of the unit 3 to be driven in the XY directions, the drive element 7 in the Z-axis direction and the sample (not shown) is adjusted to bring between the upper surface and lower surface, which face against each other in the Z-axis direction, of the drive element 5 in the X-axis direction and drive element 6 in the Y-axis direction.

According to this embodiment, the drive element 7 in the Z-axis direction within the concave 26 is pressed from the above against the first surface 1a by a leaf spring 11 to fix the drive element 7 in the Z-axis direction within the concave 26. Since the upper surface in the Z-axis direction of the drive element 7 in the Z-axis direction is lower than the upper surface in the Z-axis direction of the leaf spring 11, a mounting platform 12 on which a sample is to be mounted is bonded and fixed to the upper surface of the drive element 7 in the Z-axis direction.

Therefore, the positioning apparatus described in this embodiment and the scanning probe microscope employing it of this embodiment have following advantages.

1. In the positioning apparatus M2 of this embodiment, the entire barycenter of the unit 3 to be driven in the XY directions, the drive element 7 in the Z-axis direction and the sample is adjusted to bring between the upper surface and lower surface, which face against each other in the Z-axis direction, of the drive element 5 in the X-axis direction and drive element 6 in the Y-axis direction. Thus, the movement to be twisted in the Z-axis direction of the unit 3 to be driven in the XY directions can be prevented when it is driven in the XY directions, and the crosstalk in the Z-axis direction, which is caused by the operation in the XY directions, can be prevented. Therefore, the mix of the movement in the Z-axis direction to the movement in the vibration mode at a lower resonance frequency can be further suppressed, and the control band in the Z-axis direction is not limited by a lower resonance frequency in the XY directions.

2. In the positioning apparatus M2 of this embodiment, the entire barycenter of the unit 3 to be driven in the XY directions, the drive element 7 in the Z-axis direction and the sample is adjusted to bring between the upper surface and lower surface, which face against each other in the Z-axis direction, of the drive element 5 in the X-axis direction and drive element 6 in the Y-axis direction. Thus, the occurrence of the vibrations in the direction that falls in the XY directions the drive element 7 in the Z-axis direction can be prevented when it is driven in the XY directions. Therefore, the mix of the crosstalk in the XY directions to the vibrations in the Z-axis direction can be prevented, and the precision of the responsivity in the Z-axis direction can be further improved.

In the scanning probe microscope of this embodiment employing the positioning apparatus M2 of this embodiment as described above, the sample 13 is moved in multiple axial directions, and the surface of the sample 13 having minute concaves and convexes is tracked in measuring the surface form of the sample 13. Therefore, the speed of the responsivity in the Z-axis direction that requires the highest responsivity can be further increased, and the control band in the Z-axis direction can be extended, which can increase the speed of measurement.

It is apparent that the advantages obtained by the positioning apparatus M1 and the scanning probe microscope employing it can also be obtained by the positioning apparatus M2 of this embodiment and the scanning probe microscope employing it.

What is claimed is:

1. A positioning apparatus comprising:
    a stage unit extending in first and second directions and comprising a first surface and a second surface, the stage unit comprising:
        a center unit having a substantially square form in plane geometry,
        a first elastic support arranged to contact two sides of the center unit along the first direction, the first elastic support bending in the second direction on one or more sides of the two sides of the center unit; and
        a second elastic support arranged to contact remaining two sides of the center unit along the second direction, the second elastic support bending in the first direction on one or more sides of the remaining two sides, the first direction being orthogonal to the second direction;
    a support unit that supports the stage unit in the first and second directions, wherein a surface of the support unit faces the second surface of the stage unit;
    a first drive element that expands and contracts in the first direction and has one end that presses the second elastic support;
    a second drive element that expands and contracts in the second direction and has one end that presses the first elastic support;
    a third drive element that expands and contracts in a third direction orthogonal to the first and second directions, the third drive element comprising one end attached on a top surface of the center unit; and
    wherein an object is mounted on the other end of the third drive element and the first, second and third drive elements expand and contract in the first, the second and the third directions, respectively, to position the object; and
    wherein the second surface of the stage unit is spaced from the surface of the support unit, and the space is filled with a viscosity agent.

2. The positioning apparatus according to claim 1, wherein the thickness of the space is 5 to 50 μm.

3. The positioning apparatus according to claim 1, wherein a spacer is arranged in an area other than the center unit and the first and second elastic supports of the stage unit in the first and second directions, and the thickness of the spacer is equal to or smaller than 50 μm and is larger than $r+(Rzb+Rzh)/2$ where the diameter of fine particles contained in the viscosity agent is r, a maximum height indicating the surface roughness of the surface of the support unit is Rzb, and a maximum height indicating the surface roughness of the second surface of the stage unit is Rzh.

4. The positioning apparatus according to claim 1, wherein the center unit has a concave on the top surface that receives the one end of the third drive element, and the entire barycenter of the center unit, the third drive element and the object is adjusted to between top surfaces and bottom surfaces of the first drive element and second drive element where the bottom surfaces face against the surface of the support unit.

5. The positioning apparatus according to claim 1, wherein the viscosity agent is grease.

6. The positioning apparatus according to claim 5, wherein the space is 5 to 50 μm, the diameter of the fine particles contained in the viscosity agent is equal to or smaller than 5 μm, Rzh is equal to or smaller than 10 μm, and Rzb is equal to or smaller than 10 μm.

7. The positioning apparatus according to claim 1, wherein the viscosity agent is lubricating oil.

8. The positioning apparatus according to claim 1, wherein the viscosity agent is a gel-like substance.

9. A scanning probe microscope comprising:
    a probe to be brought closely to or in contact with the object; and
    the positioning apparatus according to claim 1 that positions the object by moving the object in the first direction, the second direction orthogonal to the first direction and the third direction orthogonal to the first direction and the second direction.

* * * * *